United States Patent [19]
Guillotel et al.

[11] Patent Number: 5,604,602
[45] Date of Patent: Feb. 18, 1997

[54] PROCESS AND DEVICE FOR BITE-RATE REDUCTION FOR THE RECORDING OF IMAGES ON A VIDEO RECORDER

[75] Inventors: Philippe Guillotel, St Etienne; Philippe Tourtier, Rennes, both of France

[73] Assignee: Thomson-CSF, Paris, France

[21] Appl. No.: 424,465

[22] PCT Filed: Oct. 29, 1993

[86] PCT No.: PCT/FR93/01076

§ 371 Date: May 3, 1995

§ 102(e) Date: May 3, 1995

[87] PCT Pub. No.: WO94/10800

PCT Pub. Date: May 11, 1994

[30] Foreign Application Priority Data

Nov. 3, 1992 [FR] France ................... 92 13153

[51] Int. Cl.⁶ .................. H04N 9/79; H04N 5/76
[52] U.S. Cl. .................. 386/33; 348/398; 348/438; 386/109; 386/112
[58] Field of Search .................. 360/32, 48, 22, 360/10.3, 9.1; 358/335, 310; 348/398, 397, 384, 438; H04N 9/79, 5/76

[56] References Cited

U.S. PATENT DOCUMENTS

| 4,969,040 | 11/1990 | Gharavi | 348/398 |
|---|---|---|---|
| 5,021,782 | 6/1991 | Perron et al. | 341/67 |
| 5,136,374 | 8/1992 | Jayant et al. | 348/398 |
| 5,140,621 | 8/1992 | Perron et al. | 375/122 |
| 5,202,760 | 4/1993 | Tourtier et al. | 348/398 |
| 5,231,487 | 7/1993 | Hurley et al. | 348/424 |
| 5,235,420 | 8/1993 | Gharavi | 348/398 |
| 5,296,927 | 3/1994 | Guillotel | 348/415 |
| 5,309,232 | 5/1994 | Hartung et al. | 348/384 |

FOREIGN PATENT DOCUMENTS

0475251A3  9/1991  Japan ............... H04N 7/133

OTHER PUBLICATIONS

L. Vandendorpe, Optimized Quantization for Image Subband Coding, Signal Processing: Image Communication 4, pp. 65–79 Nov. 1991.

Primary Examiner—Thai Q. Tran
Assistant Examiner—Y. Lee
Attorney, Agent, or Firm—Oblon, Spivak, McClelland, Maier & Neustadt, P.C.

[57] ABSTRACT

A method comprising breaking an image down into subbands, performing a pre-analysis of the image in image blocks, recursively and adaptively assigning the available bit-rate to each pixel in the sub-bands, selecting a quantizer determined by the source probability density and a calculation of the minimum quantizing error variance, and coding each pixel of each signal component in every sub-band according to the selected quantizer. The method is applicable to HDTV digital VCRs.

6 Claims, 2 Drawing Sheets

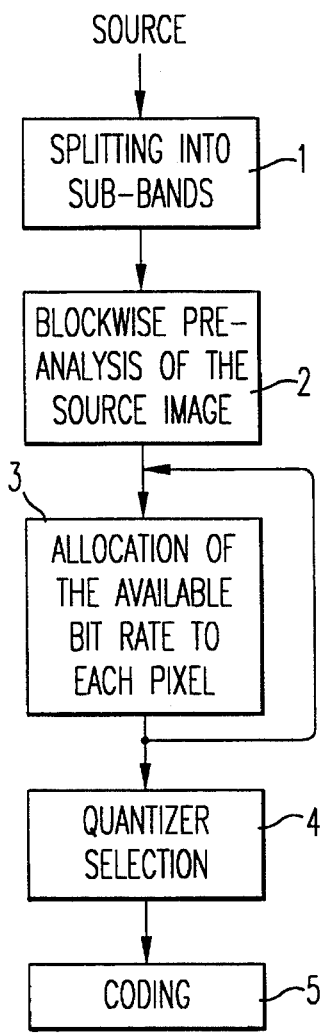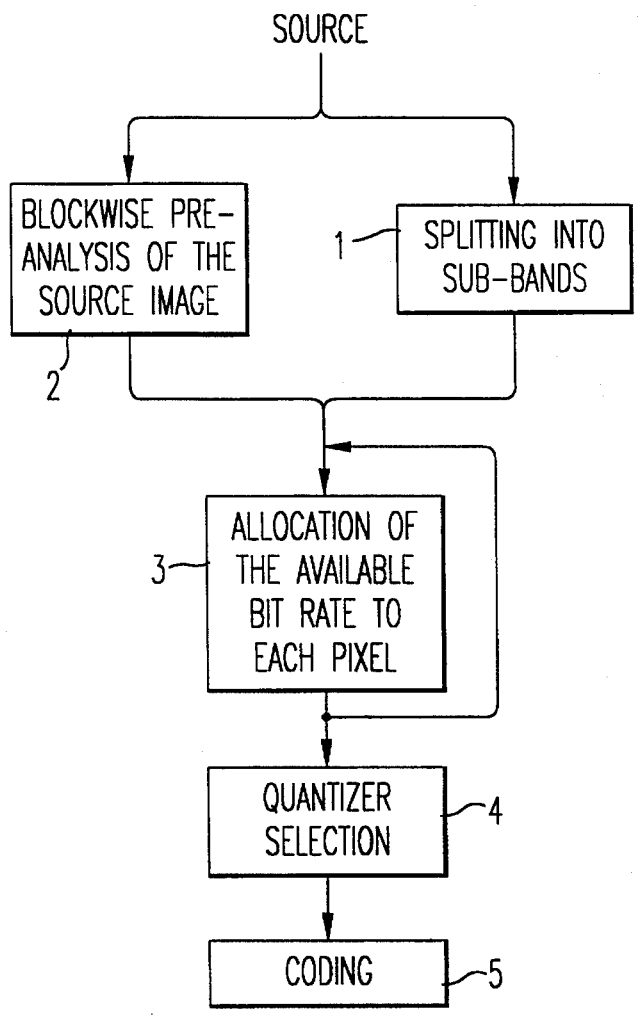
*FIG. 1A*  *FIG. 1B*
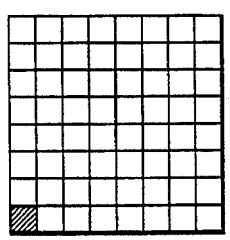 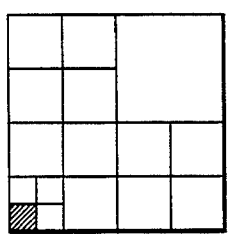
*FIG. 2A*  *FIG. 2B*
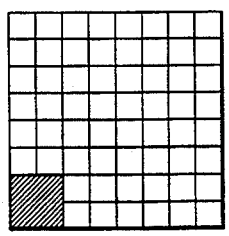 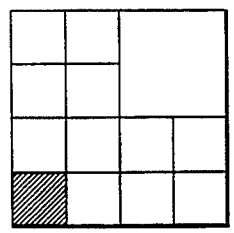
*FIG. 2C*  *FIG. 2D*

PROCESS AND DEVICE FOR BITE-RATE REDUCTION FOR THE RECORDING OF IMAGES ON A VIDEO RECORDER

BACKGROUND OF THE INVENTION

1. Field of the Invention

The present invention relates to a process and a device for bit-rate reduction for the recording of images on a video recorder.

It applies in particular to the digital recording of an image but also to the transmission and storage of images.

2. Discussion of the Background

For the high definition digital television studios of the future it would appear to be essential to be able to record the high definition television signal in digital form in order to preserve the quality of the images in the course of the multiple reading recording operations which take place while editing recording tapes. The known analog high definition video recorders use magnetic tape reels and this recording medium could also be envisaged for digital video recorders. However, to allow convenient and reliable use, cassette-based video recorders would be better adapted. In fact, current technology would appear to be unsuited to these choices since, to obtain the high data throughput demanded by such a recording, it would be necessary to use a very large number, 8 or 16, of reading heads, and a magnetic tape and a recording method of much higher performance than those currently available. Other problems related to recording on cassette are related to the fact that the time available on a tape should exceed at least 60 minutes and that the recording of the sound should be carried out on at least four digital audio channels. To meet these requirements, digital solutions with signal bit-rate compression may naturally be envisaged while conforming with the main constraints related to the use of a digital video recorder. A first constraint is that a fixed bit rate per frame or per image must be employed so as to allow image-by-image editing and random access for the images on the recording tape. Random access to the images requires an image or a frame always to commence exactly synchronously with the instant of synchronization recorded on the tape, or otherwise searching and positioning will be impossible. Image-by-image editing requires the repositioned image to occupy the same space on the tape as the new image and also the images to be truly independent of one another. In accordance with a second constraint, the coding used must allow image reading in special modes such as "slow motion", "speeded up" and the "freeze-frame advance" mode. In the "slow motion" modes, reconstruction of the images must be perfect and in the "speeded up" modes it must be possible to recognize the images. It should be appreciated that for the currently existing cassette-based video recorders, in the "slow motion" modes the information read contains few errors on account of the techniques known as "overscanning" and "tracking", slow motion can be obtained by repeating frames or by interpolation. In the "fast forward" modes, however, owing to the position of the reading heads relative to the tape, only a part of the information is read (the remainder is interpolated). Moreover, for one and the same image, some lines originate from the image at the instant t and others from the image at instants t+1, t+2, . . . , depending on the reading speed. Finally, in accordance with a third constraint, for professional applications it is imperative to guarantee quality of reconstruction without visible degradation of the image even after a coding/decoding series.

Most of the existing bit-rate reduction techniques were developed for transmission applications. They are generally based on splitting the image by cosine (or sub-band) transform followed by variable-length coding. The mean bit rate is fixed, although the bit rate can vary from one image to another. Moreover, to obtain high compression rates these techniques employ inter-image coding with motion compensation so that the images depend on the previous images.

For recording applications, the main problem is of keeping a fixed bit rate per image or image zone (per sector recorded for example) while using techniques adaptable to the contents of the image, these techniques being the only ones which provide satisfactory results. For this purpose, there are two ways of solving the problem, either by performing two passes, a first pass to obtain the binary cost of the image which allows adjustment of the parameters in order to code the image to the greatest possible extent within the available bit rate or with a pre-analysis of the image which allows the available bit rate to be allocated, as a function of the contents of each block of the image. These methods are associated with the conventional techniques used in transmission by cosine transform (or sub-band) splitting, quantization and variable-length coding or with novel methods developed for this particular application. These methods are for example described:

in the article by N. ENDOH entitled "Experimental digital VCR with New DCT-Based Bit-Rate Reduction and Channel Coding" published in the SMPTE Journal of July 1992, on pages 475 to 480 in the article by P. KAUFF entitled "A DCT Coding Scheme for Digital HDTV Recording" published in the 4th International Workshop on High Definition Television which took place in Turin in Italy in 1991 in the article by T. KONDO et al entitled "Adaptative Dynamic Range Coding Scheme for Future HDTV Digital VTR" published in the 4th International Workshop on High Definition Television in Turin in Italy in 1991 in the article by K. ONISHI et al entitled "An Experimental Home-Use Digital VCR with Three Dimensional DCT and Superimposed Error Correction Coding" published in IEEE Transactions on Consumer Electronics, Vol. 37, No. 3, August 1991 in the article by J. MAX entitled "Quantizing for Minimum Distorsion" published in the IRE journal Transaction Inform Theory, Vol. IT-6, 7–12 January 1960 in the article by P. NOLL and R. ZELINSKI entitled "Comments on: Quantizing Characteristics for Signals Having Laplacian Amplitude Probability Density Function" published in the IEEE article Transactions on Communications, Vol. COM-27, No. 8, August 1979.

In the article by N. ENDOH the coding technique is termed intra-image (that is to say independent from one image to another) with image splitting by cosine transform, quantization and then variable-length coding, the fixed bit rate is obtained by pre-analysis of the image. The latter consists of a calculation of energy per block which makes it possible to allocate the bit rate locally as a function of the difficulty of coding the blocks, and of a calculation of the global energy of the image which makes it possible to allocate the total bit rate available to code the image. However, this technique which was developed for a data formatting other than that used in current video recorders cannot solve a priori the problem of the "speeded up" modes.

In the article by P. KAUFF the method used is based on the same principle as before with a pre-analysis but also with a technique which makes it possible to solve in part the problem of the "speeded up" modes, the largest coefficients of the cosine transform not being coded with variable-length codes but inserted regularly on to the tape and on a fixed number of bits. Moreover, a choice is made between the intra-frame or intra-image modes. Nevertheless, certain problems remain unsolved, in particular as regards the solutions which have to be taken secondarily when the bit rate is exceeded. Furthermore, the result obtained in terms of image quality in the "speeded up" mode would appear to be uncertain. Moreover, this method necessitates the development of a novel video recorder which takes account of the fact that the formatting of the data on the tape is modified.

In the article by T. KONDO the method used is different since in order to obtain a bit rate which is fixed per image period that is to say over two images, the technique does not use variable-length coding, the binary cost of which is very difficult to foresee. The technique employed consists in chopping the image into blocks with 3 dimensions, with 6 lines and 6 pixels for the two consecutive images, and in then calculating the dynamic range inside each block by pre-analysis so as to allocate locally the bit rate necessary for each block. The sum of the dynamic ranges over the image then makes it possible to allocate the total bit rate available to the whole image. With this method the bit rate is fixed for 2 images. However, it does not allow the fast forward modes and editing is limited to sets of two images by two images. The results obtained would therefore appear to be inadequate for the production of a professional video recorder.

In the article by K. ONISHI a three-dimensional cosine transform involving four images, followed by a splitting into four frequency bands are employed. A first pass determines the cost of each block and the quantization is adapted in accordance with the available bit rate. However, the article offers no solution in respect of the speeded up modes and editing is limited to four images. Also, the signal-to-noise ratio is inadequate to allow production of professional video recorders.

SUMMARY OF THE INVENTION

The purpose of the invention is to alleviate the aforesaid drawbacks.

To this end, the object of the invention is a process of bit-rate reduction for the recording of images on a digital video recorder, characterized in that it consists:

in splitting the image into sub-bands, in performing a pre-analysis of the image by image blocks, in recursively and adaptively allocating the available bit rate to each pixel of the split image, in selecting a quantizer determined by the probability density of the source and a minimum variance calculation for the quantization error and in coding as a function of the selected quantizer each pixel of each component of the signal in each sub-band.

The object of the invention is also a device for the implementation of the aforesaid process.

Its main advantage is that it makes it possible to satisfy the requirements of professional digital video recorders through the quality of the images obtained, the special modes, multigeneration of images, and the editing facilities which it allows.

Furthermore, it makes it possible to obtain a sub-sampled image or "sub-image" coded over a reduced number of bits within the base band for each of the luminance and chrominance components allowing operation of digital video recorders in fast-forward modes and ensuring compatibility with existing video recorders. The size of each "sub-image" can be chosen on the basis of a compromise between image quality and available bit rate. Each sub-image is obtained simply by taking just the base band of a sub-band splitting (by cosine transformation for example), or several reunited sub-bands or again a sub-sampled source image. By representing the image as frequency bands it can then easily be transmitted or subtracted from the image to be coded by suppressing for example the high frequency bands in the event that the available bit rate is exceeded. By using non-linear quantizers, they can be limited to 6 in number for example for the non-linear quantizers, retaining a linear quantizer to code the low frequencies.

Finally, it makes it possible to retain a data format which is entirely compatible with the 4/2/2 format of existing video recorders, the data nevertheless being coded on words whose length is known by virtue of auxiliary data furnishing the variance of the quantization error for each component, luminance and chrominance.

Recording of the auxiliary data allows subsequent decoding of the data words with a length which is known by virtue of these auxiliary data.

BRIEF DESCRIPTION OF THE DRAWINGS

Other characteristics and advantages of the invention will emerge below with the aid of the description which follows provided in connection with the appended drawings which represent:

FIGS. 1a and 1b the various steps of the process according to the invention in the form of a flowchart;

FIGS. 2a to 2d, examples of splitting the image into sub-bands in a Fourier space;

DESCRIPTION OF THE PREFERRED EMBODIMENTS

Figure 3:
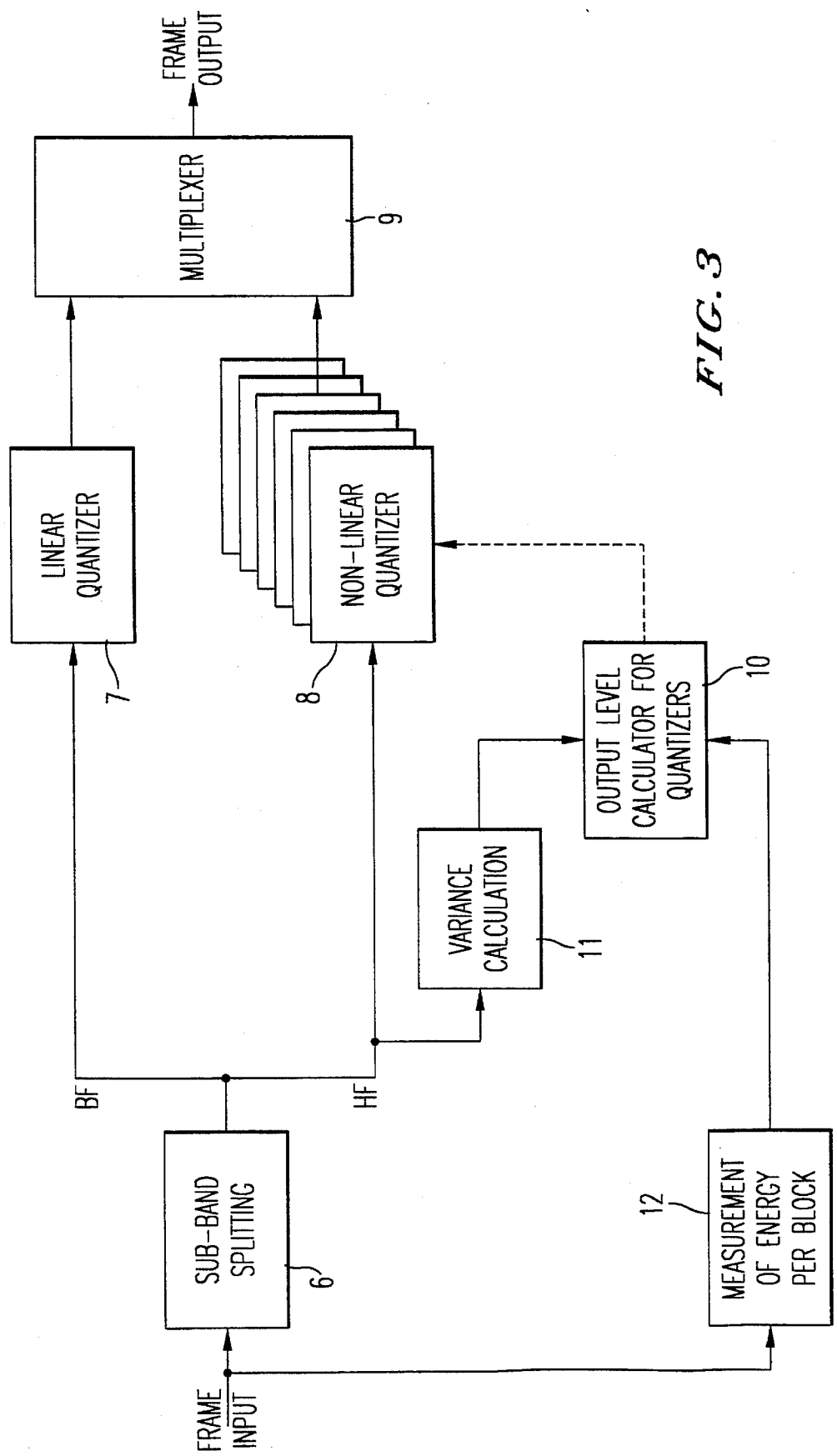
FIG. 3, a device for the implementation of the process according to the invention.

The main characteristics employed by the coding technique according to the invention consist in performing an intra-image coding on interlaced or sequential source images so as subsequently to split the image into sub-bands (either by sub-band filtering, or by cosine transform on the basis of blocks of 8×8 pixels for example), in performing a pre-analysis of the image blockwise so as to allocate an adaptive bit rate to each pixel of the split image for each luminance and chrominance component. Linear quantization is performed on the base band (low frequency band) of the image and non-linear quantization is performed on the others. This makes it possible to perform a coding of the base band on 8 bits for each of the luminance and chrominance components and thus to obtain a sub-sampled image hereafter called the "sub-image".

The process consists according to the steps represented in the flowcharts of FIGS 1a and 1b in performing according to a first step 1 a splitting of the image into sub-bands, in performing in step 2 a pre-analysis of the image in blocks of a specified number of pixels for example 8×8, in allocating to each pixel according to step 3 the available bit rate recursively as a function of the energy contained in each of the blocks of 8×8 pixels and in each band, so as to perform in step 4 selection of a quantizer and an appropriate coding of each component in step 5.

The splitting of the image into sub-bands which is performed in step 1 takes place in a manner similar to that described for example in French Patent Application No. 2 654 887 or 2 661 062 filed in the name of the Applicant, either by splitting with a complete tree FIG. 2a of 64 sub-bands or else by hierarchical splitting with a tree with 16 sub-bands as represented in FIG. 2b which depicts the various levels of resolution within the domain of vertical and horizontal spatial frequencies measured in cycles per image width and height. Owing to this splitting the recorded data are not correlated with one another, except within the base band, the interpolated data in the speeded-up modes (which is known in current digital video recorders) become inconsistent and the decoding of the images thereby exhibits mediocre quality. To solve this problem, the most important sub-bands are coded with a fixed bit rate irrespective of the image. An acceptable quality/bit rate compromise is obtained by allotting a fixed bit rate for the four sub-bands comprising the base band. The result is however improved through splitting the image into sub-bands with the aid of a complete tree except for the base band which is split by one level less than the others, as shown by the tree with 61 sub-bands of FIG. 2c with its hierarchical version with 13 sub-bands, represented in FIG. 2d. This arrangement makes it possible to quantize the base band (4 times larger) with a fixed-increment linear quantizer providing an image coded on 8 bits complying with the data ordinarily recorded on digital video recorders.

The blockwise pre-analysis of the image consists in calculating a function of the energy of each block of a specified number of pixels, 8×8, for example, by calculating the variance of each sub-band other than the base band (FIG. 1a). The purpose consists in determining the blocks of 8×8 pixels for example of the image for which the coding appears more complicated than the others, these latter being represented by the blocks of the image radiating the high frequencies. This calculation is carried out on each component of luminance or of chrominance. The calculation matches up each pixel of a sub-band with a block of 8×8 pixels in the source image. For each block of 8×8 pixels the discrepancy between the value of the pixel after sub-band splitting and the variance of the relevant sub-band is [sic] calculated. The result taken into account is equal to the sum of the results obtained in each of the sub-bands.

This calculation is summarized by the following empirical formula:

$$\forall i / |F_p(k,i,n)| \geq \sqrt{var(i,n) \cdot cod(k,n)} = \frac{\alpha}{N} \sum_{i=1}^{N} (|F_p(k,i,n)| - \sqrt{var(i,n)}) \quad (1)$$

with i ≠ bdb and 1 ≤ cod (k,n) ≤ 4 where i is an index which represents the sub-band number, n represents a luminance or chrominance component (y, $C_R$, $C_b$)

k is the number of each relevant block of 8×8 pixels bdb is the number of the base band N is the number of sub-bands used (61 for example)

fp(k,i,n) represents the value of the pixel belonging to block k of sub-band i for component n.

var(i,n) represents the variance of sub-band i for component n cod(k,n) is a weighting coefficient of block k of components n and α is a coefficient which depends on the luminance or chrominance components (α=1 for luminance and 2 for each of the 2 chrominance components).

The weighting coefficient "cod(k,n)" is involved in the adaptive allocation of the available bit rate to each pixel of the split image.

However, the pre-analysis of the image which has just been described is not unique and can for example be replaced by a more conventional technique based on calculating the energy in blocks of 8×8 pixels of the source image (FIG. 1b). The attraction is that the calculation can then be performed in parallel with the sub-band splitting, thus introducing no additional image delay. The method consists in calculating the variances of the different blocks of 8×8 pixels of the source image so as to yield a value of local variance and then in calculating the variance of the results or global variance. This makes it possible to obtain the weighting coefficient by using for example the logarithm of the ratio of the local and global variances. In this case the permitted values are 1/2, 1 and 2 instead of 1, 2, 3 or 4 as before. However, although comparable, the results obtained appear to be better with the previous technique.

Allocation of the available bit rate to each sub-band other than the base band is performed by coding the low frequency bands to a greater extent than the high frequency bands. Inside each sub-band, each pixel corresponding to a block of 8×8 pixels is weighted by the coefficient "cod" determined earlier during the pre-analysis step 2. The problem consists in determining for each pixel the number of levels of representation of the quantizer so as to minimize the total quantization error whilst conforming to a global bit rate which is fixed by the image. This calculation presupposes that the frequency bands, the low frequency band excepted, follow Laplacian distributions. For this purpose it uses a fixed-length code and non-linear quantizers such as those described in the article entitled "Quantizing for Minimum Distorsion" and published in the IRE journal Trans. Inform. Theory, Vol. IT-6, 7–12 January 1960 written by J. MAX. By following this method, the low frequency band is still coded on 8 bits per pixel with a fixed-increment linear quantizer. Determination of the number of levels of the quantizers employs the method of Lagrange multipliers.

Application of this method makes it possible to allot a bit rate for each pixel by considering the variance of the total quantization error relative to the variance of the quantization error for each component n of luminance or of chrominance in each of the bands i other than the base band.

For a MAX quantizer, the variance V of the total quantization error is given by:

$$V = \sum_i \sum_n V(i,n) \quad (2)$$

with $$V(i,n) = \epsilon^2 \cdot 2^{-2b(i,n)} \cdot Var(i,n) \quad (3)$$

where:

V(i,n) denotes the variance of the quantization error for band i for component n $\epsilon^2$ is a constant equal to 4.5 for example b(i,n) is the bit rate of band i for component n Var(i,n) is the variance of band i of component n.

By considering a bit rate which can vary within a band, rather than a constant bit rate, the above formula generalizes and becomes:

$$V(k,i,n) = \epsilon^2 \cdot 2^{-2 \cdot b(k,i,n)} \cdot \text{Var}(k,i,n) \quad (4)$$

in which:

$V(k,i,n)$ is the variance of the quantization error for a pixel k of band i for component n.

$b(k,i,n)$ is the bit rate of the relevant pixel and $\text{Var}(k,i,n)$ is a function of the variance of the band for the relevant pixel.

For sub-bands of identical size (64 in the example of FIG. 2a or 60 for FIG. 2c) to each pixel k of a band i there corresponds a source image block (of size 8×8 pixels corresponding to 3 levels of splitting, for the examples of FIGS. 2a and 2c).

In this case:

$$\text{Var}(k,i,n) = \frac{\text{Var}(i,n)}{N_k} \cdot \text{cod}^2(k,n) \quad (5)$$

where:

$N_k$ is equal to the number of pixels per band $\text{cod}(k,n)$ is the weighting coefficient defined earlier of pixel k of component n.

To minimize the error $V(k,i,n)$ with the constraint of a fixed bit rate B per image by using the known method of Lagrange multipliers, the operation amounts to solving the partial differential equation:

$$\frac{\partial V}{\partial b(k,i,n)} + \lambda \frac{\partial B}{\partial b(k,i,n)} = 0 \quad (6)$$

where $\lambda \in \mathbb{R}$

Since $$B = \sum_k \sum_i \sum_b b(k,i,n),$$

relation (6) simplifies and becomes $$\frac{\partial V}{\partial b(k,i,n)} = -\lambda \quad (7)$$

Bearing in mind relation (4) relation (7) can also be written:

$$-\lambda = \epsilon^2(-2 \cdot \ln 2) \cdot 2^{-2b(k,\lambda,n)} \cdot \frac{\text{Var}(i,n)}{N_k} \cdot \text{cod}^2(k,n) \quad (8)$$

This makes it possible to obtain the binary bit rate for a pixel in each sub-band through the relation $$b(k,i,n) = \frac{1}{2} \text{Log}_2 \left( \frac{2 \cdot \epsilon^2 \cdot \ln 2 \cdot \text{Var}(i,n) \cdot \text{cod}^2(k,n)}{\lambda \cdot N_k} \right) \quad (9)$$

By imposing on B a maximum bit rate per image such that $$B = \sum_k \sum_i \sum_n b(k,i,n) = D_{max} \quad (10)$$

where $$\sum_k \sum_i \sum_n$$

corresponds to the number $N_T$ of points to be processed per image and on substituting the expression (9) into the expression (10) the constant $\lambda$ appears to be fully defined by the relation $$\lambda = 2 \left\{ \frac{\sum_k \sum_i \sum_n \frac{1}{2} \cdot \text{Log}_2((2 \cdot \epsilon^2 \cdot \ln 2 \cdot \text{var}(i,n) \cdot \text{cod}^2(k,n)) N_k^{-1}) - D_{max}}{N_T} \right\}$$

In the case of a recursive calculation procedure $\lambda$ is determined in each sub-band for each component so as to obtain the desired maximum bit rate:

If btr-nec denotes the bit rate necessary at the current instant in order to code the remainder of the sub-bands namely $$\sum_k \sum_i \sum_n b(k,i,n)$$

with $\lambda = 1$ and i,n varying from the current sub-band to the last sub-band btr-ava denotes the available bit rate remaining at the current instant (namely $D_{max}$ minus the bit rate used for the sub-bands already processed) relation (11) becomes $$\lambda = 2^{\frac{2(btr-nec-btr-ava)}{N_p}}$$

$N_p$: Number of pixels remaining to be processed at the current instant.

The various approximations made in the course of processing may cause the bit rate to be exceeded, in this case the pixels corresponding to the bands from the highest frequencies to the lowest are not transmitted until the max bit rate is obtained.

J. MAX's method of quantization mentioned earlier presupposes that the probability density of the source is known. The purpose of the latter is to minimize the variance of the error while fixing upon a number of levels of representation. The number of levels of representation of the J. MAX quantizer is given by the relation $$Nb\_\text{rep}(k,i,n) = 2^{b(k,i,n)} - 1$$

and the probability density of the source is assumed to follow a Laplacian distribution.

A MAX quantizer with 2N+1 levels of representation is fully defined by the data of sequences $X_1$ to $X_N$ and $Y_1$ to $Y_N$ corresponding respectively to the decision intervals and to the representation values of the $N_b$–rep(k,i,n) levels.

Two methods may be followed to determine the sequences Xi and Yi. The first is iterative and is known by the name of the Lloyd method. The second calculates a recurring sequence from which decision intervals and reconstruction intervals are determined. The second method which is described for example in the article by P. NOLL and R. ZELINSKI entitled "Comments on: Quantizing Characteristics for Signals Having Laplacian Amplitude Probability Density Function" which appeared in the IEEE journal Transactions on Communications, Vol. COM-27, No. 8, August 1979, is simpler to implement since the Xi and Yi are given by relations of the form $$x_i = a_{N+1-i} + 2 \cdot \sum_{j=N+2-i}^{N} a_j$$

$$y_i = 2 \cdot \sum_{j=N+1-i}^{N} a_j$$

The sequence (ai) is defined in the case of a Laplacian distribution with unit variance. Under these conditions, the input signals to the quantizers can be normalized by using the variances and the coefficients "cod" of the pre-analysis. The number of bits is limited to between 3 and 8, this making it possible to use just six different non-linear quantizers for all the images.

A device for implementing the aforesaid process is represented in FIG. 3. It includes a device for chopping the image into sub-bands 6 coupled for the low frequencies with a linear quantizer 7 and for the high frequencies with one of the 6 non-linear quantizers 8. A multiplexer 9 ensures selection between the signals provided by the linear quantizer 7 and those provided by the non-linear quantizers 8. The selection of a quantizer 8 is ensured by a device 10 for calculating the number of output levels of the quantizers. This is controlled by the output of a device for calculating the sub-band variance 11 and by a device for measurements of the activity of blocks 12. Naturally, these devices can as a whole be embodied by microprocessor means suitably programmed according to the above-described process of the invention.

We claim:

1. Method of bit-rate reduction for recording images on a digital video recorder, the method comprising the steps of:

splitting a source image into plural sub-bands, pre-analyzing the source image by image blocks, allocating an available bit rate to each pixel of the plural sub-bands recursively and adaptively, as a function of a spatial parameter and a frequency parameter, the spatial parameter calculated during the pre-analysis step, selecting a quantizer determined by a probability density of the source image and a minimum variance calculation for a quantization error, and coding, as a function of the selected quantizer, each pixel of each component of the source image in each of the plural sub-bands, wherein the step of pre-analyzing the source image by image blocks comprises the sub-step of calculating an adaptive weighting coefficient, cod(k,n), based on a difference in each of the plural sub-bands between values, $F_p(k,i,n)$, of each pixel of a block and a first variance, Var(i,n), of the each of the plural sub-bands in accordance with the relation $$cod(k,n) = \frac{\alpha}{N} \sum_{i=1}^{N} (|F_p(k,i,n)| - \sqrt{Var(i,n)})$$

where i is a sub-band number, n represents a luminance component or a chrominance component, k denotes a block number, N is a number of sub-bands used, $F_p(k,i,n)$ represents a value of the pixel belonging to block k of sub-band i for component n, Var(i,n) is the first variance of sub-band i for component n, cod(k,n) is an adaptive weighting coefficient for block k of component n, and $\alpha$ is a coefficient dependent on the luminance and chrominance components.

2. Method according to claim 1, wherein the step of allocating the available bit rate to each pixel of each sub-band comprises the sub-steps of:

allocating bits to lower frequency bands to a greater extent than higher frequency bands, and weighting each image block by the weighting coefficient cod(k,n); and wherein the step of coding comprises coding each pixel using b(k,i,n) bits.

3. Method according to claim 2, wherein the step of allocating the available bit rate b(k,i,n) for each pixel of each sub-band comprises the steps of:

determining a coefficient $\lambda$ determined by using Lagrange multipliers in order to minimize the variance of the quantization error in each sub-band, allocating the available bit rate based on a variance of each component n of a band i weighted by a square of the adaptive weighting coefficient cod(k,n) and divided by a number of pixels, $N_k$, per band, and weighting the variance by the coefficient $\lambda$ determined using the Lagrange multipliers.

4. Method according to any one of claims 1, 2 and 3, further comprising the step of recording an image sub-sampled from the source image compatibly with existing digital video recorders.

5. System for reducing a bit-rate for recording images on a digital video recorder, the system comprising:

a sub-band splitter for splitting an image into plural sub-bands, a linear low frequency quantizer coupled to the sub-band splitter, a non-linear high frequency quantizer, a multiplexer;

a sub-band variance calculating device;

a device for measuring energy per block;

a calculating device for calculating a number of output levels of the linear low frequency and non-linear high frequency quantizers, the calculating device being controlled by the sub-band variance calculating device and the device for measuring energy per block; and a pre-analyzer for calculating an adaptive weighting coefficient, cod(k,n), based on a difference in each of the plural sub-bands between values, $F_p(k,i,n)$, of each pixel of a block and a first variance, Var(i,n), of the each of the plural sub-bands in accordance with the relation $$cod(k,n) = \frac{\alpha}{N} \sum_{i=1}^{N} (|F_p(k,i,n)| - \sqrt{Var(i,n)})$$

where i is a sub-band number, n represents a luminance component or a chrominance component, k denotes a block number, N is a number of sub-bands used, $F_p(k,i,n)$ represents a value of the pixel belonging to block k of sub-band i for component n, Var(i,n) is the first variance of sub-band i for component n, cod(k,n) is an adaptive weighting coefficient for block k of component n, and $\alpha$ is a coefficient dependent on the luminance and chrominance components.

6. Method according to any one of claims 1, 2 and 3, further comprising the step of recording the plural sub-bands compatibly with existing digital video recorders.

* * * * *